United States Patent
Soorus et al.

(10) Patent No.: US 6,755,551 B2
(45) Date of Patent: Jun. 29, 2004

(54) THIN PROFILE TASK LIGHT

(75) Inventors: Armas D. Soorus, Dorr, MI (US); Daniel E. Waugh, Kentwood, MI (US); Jeffrey T. Charon, Grandville, MI (US); Scott A. Williamson, Caledonia, MI (US); Douglas D. Buyce, Ada, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 10/163,841

(22) Filed: Jun. 6, 2002

(65) Prior Publication Data

US 2003/0161148 A1 Aug. 28, 2003

Related U.S. Application Data

(60) Provisional application No. 60/360,454, filed on Feb. 28, 2002.

(51) Int. Cl.[7] .............................. F21V 23/02; F21S 3/00; H01R 33/08
(52) U.S. Cl. .................... 362/221; 362/33; 362/223; 362/217; 315/58
(58) Field of Search .................... 362/221, 33, 223, 362/217, 216, 218, 19, 220, 222, 224; 315/58

(56) References Cited

U.S. PATENT DOCUMENTS

| | | |
|---|---|---|
| 3,996,493 A | 12/1976 | Davenport et al. |
| 4,941,071 A | 7/1990 | Knauf |
| 4,969,075 A | 11/1990 | Helm et al. |
| RE33,593 E * | 5/1991 | Herst et al. .................. 362/223 |
| 5,079,680 A | 1/1992 | Kohn |
| 5,226,719 A | 7/1993 | Feldpausch et al. |
| 5,289,357 A | 2/1994 | Fabbri |
| 5,440,467 A | 8/1995 | Lautzenheiser |
| 5,521,805 A * | 5/1996 | Lim ........................... 362/221 |
| 5,530,628 A * | 6/1996 | Ngai ........................... 362/33 |
| 5,626,084 A | 5/1997 | Kelly et al. |
| 5,658,067 A | 8/1997 | Engle et al. |
| D386,278 S | 11/1997 | Engle et al. |
| 5,720,546 A * | 2/1998 | Correll et al. ............... 362/221 |
| 5,984,486 A | 11/1999 | Munz et al. |
| D443,096 S | 5/2001 | Echito |
| D449,402 S | 10/2001 | Echito |
| D452,340 S | 12/2001 | Pickett et al. |
| 6,376,991 B1 * | 4/2002 | Sundaram et al. ............ 315/58 |
| 6,558,020 B1 * | 5/2003 | Holzer ....................... 362/221 |

* cited by examiner

Primary Examiner—Stephen Husar
Assistant Examiner—James Cranson
(74) Attorney, Agent, or Firm—Price, Heneveld, Cooper, DeWitt & Litton, LLP

(57) ABSTRACT

A thin profile task light includes a housing having a longitudinally extending and downwardly opening window, an elongated lighting element located within the housing and including electrical connectors located at opposite ends thereof, and a plurality of electrical power sockets shaped to receive the opposite ends of the lighting element therein. The task light also includes a reflector located between the lighting element and the housing, a lens covering the window of the housing, and a power supply assembly that includes an electrical switch controlling the supply of electrical power to the lighting element, a ballast regulating the supply of electrical power to the lighting element, and a circuit board, wherein the electrical switch in the ballast mounted on the circuit board. The task light has an overall thickness of within the range of from about 0.5 inches to about 1.0 inches.

37 Claims, 3 Drawing Sheets

THIN PROFILE TASK LIGHT

CROSS-REFERENCE TO RELATED APPLICATION

This application claims the benefit of U.S. Provisional Application No. 60/360,454, filed Feb. 28, 2002, entitled THIN BALLAST TASK LIGHT, which is hereby incorporated herein by reference in its entirety.

The present invention relates to a task light, and in particular to a task light having a thin overall profile.

Task lights are used in a wide variety of applications, such as the office furniture industry, overhead residential and industrial lighting, as well as lighting within recreational vehicles and the like. These task lights typically include a housing, a lighting element suspended within the housing, a reflector to reflect the light generated by the lighting element from within the housing, a lens covering the lighting element, and associated electrical components.

Heretofore, task lights have been constructed in a manner that results in the task light having a substantial overall profile thickness, thereby requiring significant space to be provided for the mounting of the light. New designs in office furniture such as partition and shelving units attempt to maximize the utilization of ever shrinking office space, which requires accessories such as task lights to also be minimized while simultaneously providing sufficient lighting of a given space. The rigid scalability of prior task light designs has made it difficult to provide task lights having a reduced size while simultaneously effectively lighting a given desk top and/or room area.

SUMMARY OF THE INVENTION

One aspect of the present invention is to provide a thin profile task light that includes an elongated housing having a longitudinally extending and downwardly opening window, an elongated lighting element located within the housing and including electrical connectors located at opposite ends thereof, and a plurality of electrical power sockets shaped to receive the opposite ends of the lighting element therein to physically support the lighting element and electrically connect with the electrical connectors to supply electrical power to the lighting element. The task light also includes a reflector located between the lighting element and the housing, and a lens covering at least a portion of the window of the housing. The task light further includes a power supply assembly that includes an electrical switch controlling the supply of the electrical power to the ballast, a ballast regulating the supply of electrical power to the lighting element, and a circuit board, wherein the electrical switch and the ballast are mounted on the circuit board. The task light has an overall thickness of within the range of from about 0.5 to about 1.0 inches.

Another aspect of the present invention is to provide an elongated housing having a longitudinally extending and downwardly opening window, an elongated lighting element located within the housing and including electrical connectors located at opposite ends thereof, and a plurality of electrical power sockets shaped to receive the opposite ends of the lighting element therein to physically support the lighting element and electrically connect with the electrical connectors to supply electrical power to the lighting element. The task light also includes a reflector located between the lighting element and the housing, and a lens covering at least a portion of the window of the housing. The task light further includes an electrical switch controlling the electrical power supplied to the lighting element, and a ballast for regulating the electrical power supplied to the lighting element. The task light has a preferable overall thickness of within the range of from about 0.6 inches to about 1.0 inches.

Yet another aspect of the present invention is to provide a task light that includes an elongated housing having a longitudinally extending and downwardly opening window, an elongated lighting element located within the housing and including electrical connectors located at opposite ends thereof, and a plurality of electrical power sockets shaped to receive the opposite ends of the lighting element therein to physically support the lighting element and electrically connect with the electrical connectors to supply electrical power to the lighting element. The task light also includes a power supply assembly that includes an electrical switch controlling the supply of the electrical power to the ballast, a ballast for regulating the electrical power supply to the lighting element, and a circuit board, wherein the electrical switch and the ballast are mounted on the circuit board.

The reduced overall profile thickness of the present inventive task light allows the task light to be mounted within areas of reduced space as compared to prior task light designs, thereby making more efficient use of the limited space available within office units, recreational vehicles, and the like. Further, the task light offers substantial and adequate lighting for given desk top and/or room areas.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
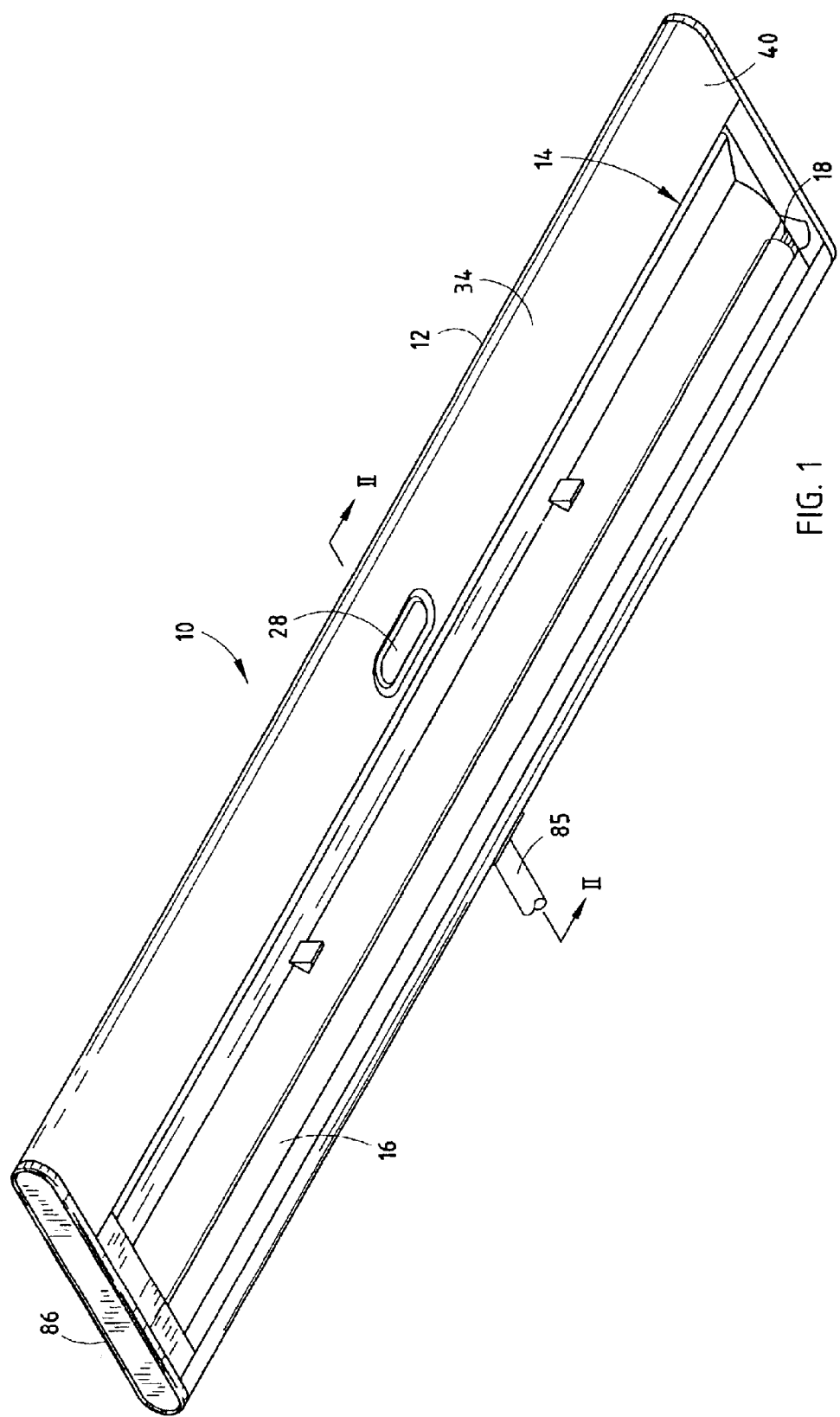
FIG. 1 is a bottom perspective view of a thin profile task light embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
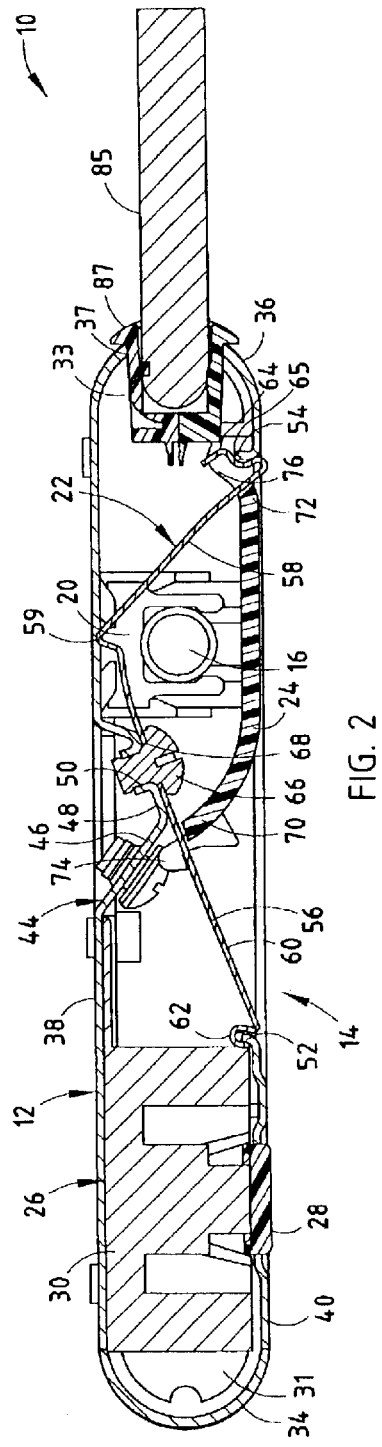
FIG. 2 is a cross-sectional side view of the task light, taken along the line II—II, FIG. 1.
Figure 3:
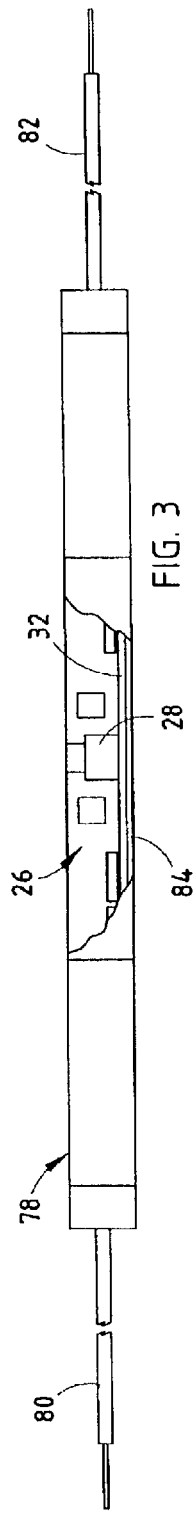
FIG. 3 is a front elevational view of a power supply assembly, wherein a casing of the power supply assembly is partially broken away to show the internal components thereof.
Figure 4:
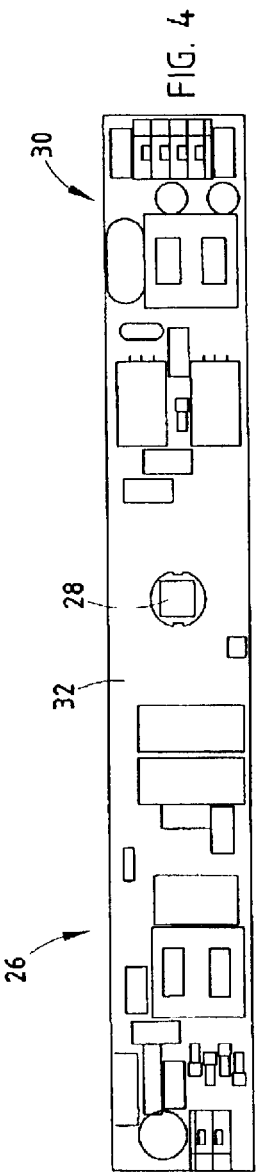
FIG. 4 is a top plan view of the power supply assembly.
Figure 5:
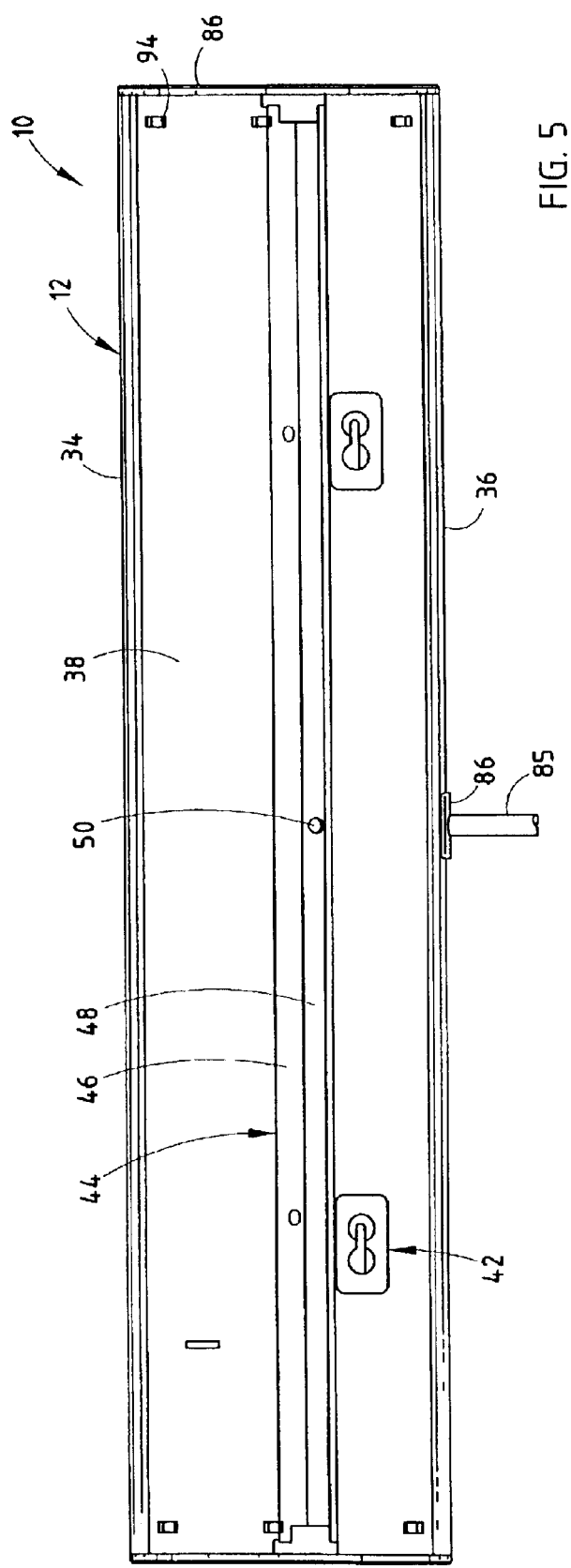
FIG. 5 is a top plan view of housing of the task light.
Figure 6:
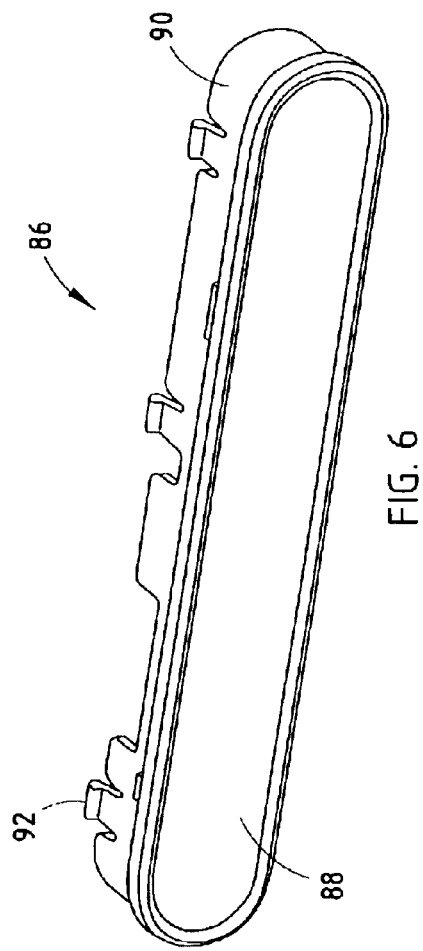
FIG. 6 is a perspective view of an end cap of the task light.

The reference numeral 10 (FIG. 1) generally designates a thin profile task light embodying the present invention. In the illustrated example, the task light 10 includes an elongated housing 12 having a longitudinally extending and downwardly opening window 14, an elongated lighting element 16 located within the housing 12 and including electrical connectors 18 located at opposite ends thereof, and a plurality of electrical power sockets 20 shaped to receive the opposite ends of the lighting element 16 therein to physically support the lighting element 16 and electrically connect with the electrical connectors 18 to supply electrical power to the lighting element 16. The task light 10 also includes a reflector 22 (FIG. 2) located between the lighting element 16 and the housing 12, and a lens 24 covering a portion of the window 14. The task light 10 further includes a power supply assembly 26 that includes an on/off electrical switch 28 controlling the supply of electrical power to the lighting element 16, a ballast 30 regulating the supply of electrical power to the lighting element 10, and a circuit board 32 (FIGS. 3 and 4), wherein the electrical switch 28 and the ballast 30 are mounted on the circuit board 32.

The housing 12 is provided an oval-shaped cross-sectional configuration and is formed via stamping, roll forming, or other suitable process. The housing 12 is further provided with a forwardly located cavity 31 and a rearwardly located cavity 33. The housing 12 includes a front edge 34, rear edge 36, a top wall 38 and a bottom wall 40. The rear edge 36 includes a centrally located aperture 37 extending therethrough. The top wall 38 includes a mounting structure 42 adapted to support the task light 10 from an overhead structure such as a shelving unit, cabinet bottom, ceiling, and the like. As illustrated, the mounting structure 42 includes a plurality of keyhole slots, however, any suitable means for supporting the task light 10 may be utilized. The top wall 38 also includes a downwardly extending V-shaped mounting surface 44 including a first portion 46 and a second portion 48. The second portion 48 of the mounting surface 44 includes an aperture 50 extending therethrough and adapted to receive mounting hardware therein, as described below. The bottom wall 40 of housing 12 includes the window 14 as partially defined by an upwardly turned first edge 52 and an upwardly turned second edge 54, each extending longitudinally along the window 14.

The lighting element 16 is preferably a T2-type fluorescent lamp, however, other reduced-sized lighting elements may be utilized depending upon the configuration of the task light 10 including the housing 12, the power assembly 26, etc. The design of the T2-type lighting element allows the task light 10 to provide sufficient illumination of a given work space, while providing a reduced profile thickness.

The reflector 22 has an inverted V-shaped cross-sectional configuration and includes a first portion 56 and a second portion 58 each having a light reflective bottom surface 60 and divided by a longitudinally extending bend point 59 located therebetween. The reflector 22 also includes a pair of side edges 62 and 64, wherein side edge 62 has a downwardly opening C-shaped channel configuration, and wherein side edge 64 has a vertically extending, resiliently flexible S-shaped portion defining an outwardly opening C-channel 65. In assembly, the reflector 22 is located between the top wall 38 of the housing 12 and the lighting element 16, and is held within the housing 12 by locating the first edge 52 within the side edges 62 and snapping the second edge 54 into the channel 65 of the side edge 64. When assembled, the bend point 59 of the reflector 22 is biased against the top wall 38 of the housing 12, while the first portion 56 of the reflector 22 abuts the second portion 48 of the mounting surface 44 of the housing 12. The reflector 22 is further connected with the housing 12 by a mechanical fastener such as machine screw 66 that extend through an aperture 68 within the first portion 56 of the reflector 22 and that is threadably received within the aperture 50 of the second portion 48 of the mounting surface 44.

The lens 24 is arcuately shaped and terminates in ends 70 and 72. The first end 70 of the lens 24 includes a plurality of hook-shaped fasteners 74 spaced therealong, while the second end 72 of the lens 24 includes a plurality of hook-shaped fasteners 76 spaced therealong. The fasteners 74 and 76 of the lens 24 are received within a plurality of apertures extending through and spaced along the length of the first portion 56 and the second portion 58 of the reflector 22.

The power supply assembly 26 is enclosed within a housing 78 constructed of a paper wrap, and includes input electrical lines 80 supplying power to the power assembly 26 from a power source (not shown), and output electrical lines 82 supplying power to the lighting element 16 from the power supply assembly 26. The circuit board 32 of the power supply assembly 26 is affixed to the top wall 38 of the housing 12 via a layer of adhesive 84 such as hot glue, and the like. It should be noted that other methods of affixing the circuit board 32 to the housing 12 may also be utilized. The electrical switch 28 and the ballast 30 are each constructed on the same circuit board 32. The ballast 30 includes components typically associated with ballasts utilized for the regulation of power within a fluorescent-type light. The ballast is constructed in a laid out configuration such that the preferred profile thickness is within the range of from about 0.6 inches to about 1.0 inches, more preferably of within the range of from about 0.6 inches to about 0.75 inches, and most preferably of less than or equal to about 0.6 inches. A power cord 85 supplies electrical power to supply assembly 26 and is connected to the housing 12 via a plug 87 press-fit into aperture 37.

The task light 10 including the housing 12, the lighting element 16, the power sockets 20, the reflector 22, the lens 24, and the thin profile power supply assembly 26 is constructed in a manner such that the task light 10 has an overall profile thickness of within the range of from about 0.6 inches to about 1.0 inches, more preferably of within the range of from about 0.66 inches to about 0.79 inches, and most preferably of less than or equal to about 0.66 inches.

The task light 10 further includes a pair of end caps 86 including an end wall 88 and an inwardly extending insert wall 90 having an oval-shaped cross-sectional geometry and adapted to be received within the ends of the housing 12. The insert wall 90 of each end cap 96 includes a plurality of resiliently flexible hook-shaped tabs 92. In assembly, the tabs 92 are received within a respective plurality of apertures 94 located within the top wall 38 of the housing 12, thereby providing a snap-like connection of the end caps 86 with the housing 12.

The reduced overall profile thickness of the present inventive task light allows the task light to be mounted within areas of reduced space as compared to prior task light designs, thereby making more efficient use of the limited space available within office units, recreational vehicles, and the like. Further, the task light offers substantial and adequate lighting for given desk top and/or room areas.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A thin profile task light, comprising:
   an elongated housing having a longitudinally extending and downwardly opening window;
   an elongated lighting element located within the housing and including electrical connectors located at opposite ends thereof;
   a pair of electrical power sockets shaped to receive the opposite ends of the lighting element therein to physically support the lighting element and electrically connect with the electrical connectors to supply electrical power to the lighting element;
   a reflector located between the lighting element and the housing;
   a lens covering at least a portion of the window; and
   a power supply assembly, comprising:
      a ballast regulating the supply of electrical power to the lighting element;
      an electrical switch controlling the supply of electrical power to the ballast; and
      a circuit board, wherein the ballast and the electrical switch are mounted on the circuit board; and
   wherein the task light has an overall thickness of within the range of from about 0.5 inches to about 1.0 inches.

2. The task light of claim 1, wherein the task light has an overall thickness of within the range of from about 0.66 inches to about 0.79 inches.

3. The task light of claim 1, wherein the task light has an overall thickness of less than or equal to about 0.66 inches.

4. The task light of claim 1, wherein the power supply assembly has an overall thickness of within the range of from about 0.6 inches to about 1.0 inches.

5. The task light of claim 4, wherein the power supply assembly has an overall thickness of within the range of from about 0.6 inches to about 0.075 inches.

6. The task light of claim 1, wherein the power supply assembly has an overall thickness of less than or equal to about 0.6 inches.

7. The task light of claim 1, wherein the lighting element is a T2-type fluorescent lamp.

8. The task light of claim 7, wherein the housing is provided an oval-shaped cross-section configuration.

9. The task light of claim 8, wherein the housing includes a V-shaped mounting surface extending downwardly from a top wall thereof, the reflector is provided with an inverted V-shaped cross-sectional configuration, and wherein the reflector is connected to the mounting surface of the housing.

10. The task light of claim 9, wherein the window is partially defined by a pair of upwardly turned side edges within the housing that extend along the length of the window, and wherein the reflector includes a pair of side edges each including a downwardly opening channel that receives one of the side edges defining the window.

11. The task light of claim 10, wherein the housing includes a forwardly located cavity, and wherein the power supply assembly is located within the forwardly located cavity.

12. The task light of claim 11, wherein lens is connected to the reflector.

13. The task light of claim 12, wherein the reflector includes a first portion and a second portion each including a plurality of apertures located along the length thereof, the lens includes opposite side edges each including a plurality of fasteners located along the length thereof and co-located with the apertures of the reflector, and wherein the lens is connected to the reflector by inserting the fasteners of the lens within the apertures of the reflector.

14. The task light of claim 13, further including:
    a pair of end caps located at opposite ends of the housing and snappingly engaged therewith.

15. The task light of claim 1, wherein the housing is provided an oval-shaped cross-section configuration.

16. The task light of claim 1, wherein the housing includes a V-shaped mounting surface extending downwardly from a top wall thereof, the reflector is provided with an inverted V-shaped cross-sectional configuration, and wherein the reflector is connected to the mounting surface of the housing.

17. The task light of claim 1, wherein the window is partially defined by a pair of upwardly turned side edges within the housing and extending along the length of the window, and wherein the reflector includes a pair of side edges each including a channel that receives one of the side edges defining the window.

18. The task light of claim 1, wherein the housing includes a forwardly located cavity, and wherein the power supply assembly is located within the forwardly located cavity.

19. The task light of claim 1, wherein lens is connected to the reflector.

20. The task light of claim 19, wherein the reflector includes a first portion and a second portion each including a plurality of apertures located along the length thereof, the lens includes opposite side edges each including a plurality of fasteners located along the length thereof and co-located with the apertures of the reflector, and wherein the lens is connected to the reflector by inserting the fasteners of the lens within the apertures of the reflector.

21. The task light of claim 1, further including:
    a pair of end caps located at opposite ends of the housing and snappingly engaged therewith.

22. A thin profile task light, comprising:
    an elongated housing having a longitudinally extending and downwardly opening window;
    an elongated lighting element located within the housing and including electrical connectors located at opposite ends thereof;
    a plurality of electrical power sockets shaped to receive the opposite ends of the lighting element therein to physically support the lighting element and electrically connect with the electrical connectors to supply electrical power to the lighting element;
    a reflector located between the lighting element and the housing;
    a lens covering at least a portion of the window;
    a ballast for regulating the electrical power supplied to the lighting element; and
    an electrical switch controlling the electrical power supplied to the ballast; and
    wherein the task light has an overall thickness of within the range of from about 0.6 inches to about 1.0 inches.

23. The task light of claim 22, wherein the task light has an overall thickness of within the range of from about 0.66 inches to about 0.79 inches.

24. The task light of claim 22, wherein the task light has an overall thickness of less than or equal to about 0.66 inches.

25. The task light of claim 22, wherein the lighting element is a T2-type fluorescent lamp.

26. The task light of claim 22, wherein the housing includes a V-shaped mounting surface extending downwardly from a top wall thereof, the reflector is provided with an inverted V-shaped cross-sectional configuration, and wherein the reflector is connected to the mounting surface of the housing.

27. The task light of claim 22, wherein the window is partially defined by a pair of upwardly turned side edges within the housing and extending along the length of the window, and wherein the reflector includes a pair of side edges each including a channel that receives one of the side edges defining the window.

28. The task light of claim 22, wherein the housing includes a forwardly located cavity, and wherein the electrical switch and the ballast is located within the forwardly located cavity.

29. The task light of claim 22, further including:
a lens connected to the reflector, wherein the reflector includes a first portion and a second portion each including a plurality of apertures located along the length thereof, the lens includes opposite side edges each including a plurality of fasteners located along the length thereof and co-located with the apertures of the reflector, and wherein the lens is connected to the reflector by inserting the fasteners of the lens within the apertures of the reflector.

30. A thin profile task light, comprising:
an elongated housing having a longitudinally extending downwardly opening window;
an elongated lighting element located within the housing and including electrical connectors located at opposite ends thereof;
a plurality of electrical power sockets shaped to receive the opposite ends of the lighting element therein to physically support the lighting element and electrically connect with the electrical connectors to supply electrical power to the lighting element; and
a power supply assembly, comprising:
a ballast for regulating the electrical power supplied to the lighting element;
an electrical switch controlling the supply of electrical power to the ballast; and
a circuit board; and
wherein the ballast and the electrical switch are mounted on the circuit board.

31. The task light of claim 30, wherein the task light has an overall thickness of within the range of from about 0.6 inches to about 1.0 inches.

32. The task light of claim 30, wherein the task light has an overall thickness of within the range of from about 0.66 inches to about 0.79 inches.

33. The task light of claim 30, wherein the task light has an overall thickness of less than or equal to about 0.66 inches.

34. The task light of claim 30, wherein the lighting element is a T2-type fluorescent lamp.

35. The task light of claim 30, wherein the power assembly has an overall thickness of within the range of from about 0.6 inches to about 1.0 inches.

36. The task light of claim 35, wherein the power assembly has an overall thickness of within the range of from about 0.6 inches to about 0.75 inches.

37. The task light of claim 30, wherein the power supply assembly has an overall thickness of less than or equal to about 0.6 inches.

* * * * *